(12) United States Patent
Dasher et al.

(10) Patent No.: US 8,185,477 B2
(45) Date of Patent: May 22, 2012

(54) SYSTEMS AND METHODS FOR PROVIDING A LICENSE FOR MEDIA CONTENT OVER A NETWORK

(75) Inventors: Charles Hammett Dasher, Lawrenceville, GA (US); Alan Rouse, Lawrenceville, GA (US)

(73) Assignee: Ericsson Television Inc., Duluth, GA (US)

( * ) Notice: Subject to any disclaimer, the term of this patent is extended or adjusted under 35 U.S.C. 154(b) by 814 days.

(21) Appl. No.: 12/347,552

(22) Filed: Dec. 31, 2008

(65) Prior Publication Data

US 2010/0169977 A1  Jul. 1, 2010

(51) Int. Cl.
*G06F 21/00* (2006.01)
(52) U.S. Cl. ............. 705/59; 705/67; 725/110; 725/115
(58) Field of Classification Search .................. None
See application file for complete search history.

(56) References Cited

U.S. PATENT DOCUMENTS

| | | | |
|---|---|---|---|
| 5,867,584 A | 2/1999 | Hu et al. | |
| 6,118,926 A | 9/2000 | Kim et al. | |
| 6,407,680 B1 * | 6/2002 | Lai et al. | 341/50 |
| 6,507,618 B1 | 1/2003 | Wee et al. | |
| 6,901,603 B2 | 5/2005 | Zeidler et al. | |
| 6,970,510 B1 | 11/2005 | Wee et al. | |
| 7,020,891 B1 | 3/2006 | Lippincott | |
| 7,278,165 B2 | 10/2007 | Molaro | |
| 7,318,236 B2 | 1/2008 | DeMello et al. | |
| 7,355,531 B2 | 4/2008 | Lai et al. | |
| 7,370,017 B1 | 5/2008 | Lindeman et al. | |
| 7,386,513 B2 | 6/2008 | Lao et al. | |
| 7,386,514 B2 | 6/2008 | Major et al. | |
| 7,403,693 B2 | 7/2008 | Shteyn | |
| 7,423,662 B2 | 9/2008 | Unger | |
| 7,457,520 B2 | 11/2008 | Rossetti et al. | |
| 7,519,658 B1 | 4/2009 | Anglin et al. | |
| 7,877,689 B2 | 1/2011 | Gilley | |
| 2002/0172498 A1 | 11/2002 | Esenyan et al. | |
| 2003/0149975 A1 | 8/2003 | Eldering et al. | |
| 2004/0103426 A1 * | 5/2004 | Ludvig et al. | 725/9 |

(Continued)

FOREIGN PATENT DOCUMENTS

EP  1936989  6/2008

OTHER PUBLICATIONS

Shamma, D.A., et al., "Watch what I watch: Using Community Activity to Understand Content"; pp. 275-283; Sep. 24, 2007.

(Continued)

*Primary Examiner* — Jamie Kucab (57) ABSTRACT

Various embodiments of the present invention provide systems, methods, and apparatus for tagging a segment of media content. In various embodiments, a beginning location and an ending location indicating the segment are recorded and are used to retrieve the segment from the media content. Various embodiments provide systems and methods for communicating the segment with a user. In various embodiments, the user requests the segment and the position of the segment in the media content and the storage location of the media content are used to extract the segment from the media content. In addition, various embodiments provide systems and methods for providing a license to the user to observe the segment. In various embodiments, a request for the license includes a player identifier and a user identifier that are used to verified the player is associated with the user and the user has rights to observe the segment.

20 Claims, 6 Drawing Sheets

U.S. PATENT DOCUMENTS

| | | | |
|---|---|---|---|
| 2004/0162846 | A1 | 8/2004 | Nakahara et al. |
| 2005/0065888 | A1* | 3/2005 | Benaloh .................... 705/51 |
| 2005/0108637 | A1* | 5/2005 | Sahota et al. ............. 715/526 |
| 2005/0210145 | A1 | 9/2005 | Kim et al. |
| 2005/0278761 | A1 | 12/2005 | Gonder et al. |
| 2006/0263038 | A1 | 11/2006 | Gilley |
| 2007/0143213 | A1* | 6/2007 | Ando et al. ................ 705/50 |
| 2007/0154190 | A1 | 7/2007 | Gilley et al. |
| 2007/0156627 | A1 | 7/2007 | D'Alicandro |
| 2007/0168543 | A1* | 7/2007 | Krikorian et al. ........... 709/231 |
| 2007/0198532 | A1* | 8/2007 | Krikorian et al. ........... 707/10 |
| 2007/0226432 | A1 | 9/2007 | Rix |
| 2007/0271184 | A1 | 11/2007 | Niebert et al. |
| 2007/0300269 | A1 | 12/2007 | Roberts et al. |
| 2008/0013919 | A1 | 1/2008 | Boston et al. |
| 2008/0033881 | A1* | 2/2008 | Ficco .......................... 705/51 |
| 2008/0124055 | A1* | 5/2008 | Shahraray et al. .......... 386/124 |
| 2008/0229205 | A1 | 9/2008 | Lee et al. |
| 2008/0247730 | A1 | 10/2008 | Barton et al. |
| 2008/0270307 | A1 | 10/2008 | Olson et al. |
| 2008/0282298 | A1* | 11/2008 | Ganesan et al. ............. 725/92 |
| 2009/0228492 | A1 | 9/2009 | Valdez et al. |
| 2010/0287473 | A1 | 11/2010 | Recesso et al. |
| 2011/0116760 | A1 | 5/2011 | Gilley |

OTHER PUBLICATIONS

Shaw, R., et al., Community annotation and remix: A research platform and pilot deployment:, pp. 89-98; Oct. 10, 2006.

International Search Report and Written Opinion from International Application No. PCT/US2009/057616 mailed Dec. 21, 2009.

International Search Report and Written Opinion from International Application No. PCT/US 2009/057746 mailed Dec. 23, 2009.

International Standard—ISO/IEC 14496-2, Information Technology—Coding of audio-visual objects—Part 2: Visual; Third Edition Jun. 1, 2004, pp. 1-18.

International Search Report and Written Opinion from International Application No. PCT/US2009/057809 mailed Feb. 2, 2010.

Bahlmann,B. et al. I-VOP-Intra-coded Video Object Plan. Birds-Eye.net, pp. 1-2. Retrieved from Internet http://birds-eye.net/definition/acronym/?id=1150246857 Dec. 30, 2008.

* cited by examiner

SYSTEMS AND METHODS FOR PROVIDING A LICENSE FOR MEDIA CONTENT OVER A NETWORK

CROSS-REFERENCE TO RELATED APPLICATIONS

This application incorporates by reference in their entirety the following co-pending applications filed concurrently with this application: U.S. patent application Ser. No. 12/347,430, filed on Dec. 31, 2008 and entitled "SYSTEMS, METHODS, AND APPARATUS FOR TAGGING SEGMENTS OF MEDIA CONTENT" and U.S. patent application Ser. No. 12/347,439 filed on Dec. 31, 2008 and entitled "SYSTEMS AND METHODS FOR COMMUNICATING SEGMENTS OF MEDIA CONTENT."

BACKGROUND OF THE INVENTION

1. Field of the Invention

The disclosed invention generally relates to systems and methods for providing a license over a network for media content, and more specifically, to systems and methods for receiving a request from individual to observe media content, determining whether individuals has rights to observe the media content, and returning a license to the individual over the network.

2. Description of the Related Art

In today's high-tech society, many individuals engage in providing media content through various channels. For example, YouTube® provides individuals with a mechanism that enables individuals to upload, post, display, tag, blog, share, or otherwise provide media content or information over the Internet and other communications networks. Thus, such websites all across the world allow individuals to post media content and share commentary on such media content to other individuals who access these websites.

One primary source for such media content is broadcasting signals. For instance, many individuals post segments of their favorite television shows on a website because they are interesting in sharing such segments with other individuals and/or providing commentary on such segments. For example, during the recent presidential race, Saturday Night Live® aired sketches based on the candidates almost weekly. These sketches were very popular among Americans, and individuals would post copies of these sketches on various websites so that others could view the sketches.

In many instances, the process for posting such media involves capturing a desired segment of the media, converting the segment of media into the proper format needed to post the segment on the website, and then uploading the formatted segment onto the website so that it can be shared. In many cases, this process requires a fairly high level of expertise in computer literacy not possessed by many individuals. In addition, many times, the segment is also based on copyrighted media content, and therefore, requires a license in order to post and view the segment on the website.

Thus, a need exists for a mechanism that allows individuals without capable computer literacy to capture segments of media content and to post such segments (with or without commentary) to closed content networks (such as a cable provider's network) and to networks outside the closed content networks. In addition, a need exists for a mechanism that provides any licenses required to post and view such segments.

BRIEF SUMMARY OF VARIOUS EMBODIMENTS OF THE INVENTION

A system for tagging a segment of media content being observed by an individual according to various embodiments includes a processor, a storage medium, and a settop device having a tag module. In various embodiments, the settop device is configured to receive media content. In addition, in various embodiments, the settop device is configured to record a first identifier indicating a beginning location in the media content and a second identifier indicating an ending location in the media content in response to receiving one or more inputs by the individual via the tag module. Furthermore, in various embodiments, the settop device is configured to send data to the processor including the first identifier and the second identifier, wherein the segment of media content is defined by the first identifier and the second identifier, and the processor is configured to receive the data and to store the data in the storage medium wherein the data is used to subsequently identify the segment of the media content.

In various embodiments, the beginning location is a predetermined offset position prior to a certain position in the media content when the settop device receives the one or more inputs. The ending location is a predetermined offset position after the certain position in the media content when the settop device receives the one or more inputs.

Furthermore, in various embodiments, the system includes a user input device. This input device is configured to receive a command from the individual and to send the command to the settop device as the one or more inputs for processing by the tag module. For example, in various embodiments, the user input device is a remote control unit.

In further embodiments, the user input device is configured to receive information from the individual and send the information to the settop device. For instance, the individual may enter information into a handheld remote control unit. In turn, the settop device is configured to send the information to the processor to store in the storage medium. In various embodiments, the processor is further configured to associate this information with the segment.

In various embodiments, the settop box is configured to include a location identifier in the data. This location identifier identifies the storage location of the media content and the identifier is used to subsequently locate the media content. In further embodiments, the processor is configured to obtain the location identifier and store the location identifier along with the data in the storage medium. In further embodiments, the settop box may also include a user identifier associated with the individual in the data. Yet, in further embodiments, the processor is configured to determine the user identifier associated with the individual based on an address of the settop device.

Further embodiments of the invention include a settop device having a tag module. In various embodiments, the device includes an input, a user input device, and a processor. The input is configured for receiving media content. The user input device is configured for receiving one or more inputs by an individual to identify a segment of the media content by the tag module. The processor is configured for receiving the media content, and in response to receiving one or more inputs by the individual to identify the segment of the media content, recording a first identifier indicating a beginning location in the media content and a second identifier indicating an ending location in the media content, and sending data to a computing device including the first identifier and the second identifier. In various embodiments, the segment of the media content is defined by the first identifier and the second identifier, and the computing device is configured to receive the data and to store the data in a storage medium wherein the data is used to subsequently identify the segment of the media content.

In addition, further embodiments of the invention include a computer-implemented method for tagging a segment of media content being observed by an individual that includes the steps of: (1) receiving media content; and (2) in response to receiving one or more inputs by the individual to identify a segment of the media content processed by a tag module associated with the settop box: (a) recording a first identifier indicating a beginning location in the media content; (b) recording a second identifier indicating an ending location in the media content; (c) sending data to a processor, wherein the data includes the first identifier and the second identifier and the segment of the media content is defined by the first identifier and the second identifier; (d) receiving the data at the processor; and (e) storing the data in storage medium, wherein the data is used to subsequently identify the segment of the media content.

Furthermore, various embodiments of the invention include a computer-readable medium containing code executable by a settop box for tagging a segment of media content being observed by an individual that includes a tag module including one or more components. In various embodiments, these components are adapted for reading media content, and in response to receiving one or more inputs by the individual: (1) recording a first identifier indicating a beginning location in the media content; (2) recording a second identifier indicating an ending location in the media content; and (3) sending data to a processor, wherein the data includes the first identifier and the second identifier and the segment of the media content is defined by the first identifier and the second identifier, and the processor stores the data in a storage medium, wherein the data is used to subsequently identify the segment of the media content.

In further embodiments of the invention, a system is provided for communicating a segment of media content with a user of an external system. In particular embodiments, the system includes a storage medium containing a plurality of records, wherein each record includes data that identifies a respective position of one of a plurality of segments in a particular media content and a storage location of the particular media content.

In various embodiments, the system further includes a network and one or more computing devices configured to provide a search engine to the external system over the network. In particular embodiments, the search engine is configured to be used by the user to search the plurality of records to identify a particular segment of media content.

The computing devices of various embodiments are further configured to: (1) receive a request over the network from the user for a particular segment of media content; (2) retrieve one or more records from the storage medium associated with the particular segment based on the user's request; (3) obtain the position of the particular segment in the particular media content from the retrieved one or more records; (4) obtain the storage location of the particular media content from the retrieved one or more records; and (5) extract the particular segment from the particular media content by utilizing the position and the storage location obtained from the retrieved one or more records to make the segment available to the user. In various embodiments, the computing devices also store the extracted segment.

In various embodiments, the request received from the user may indicate to trim or to transcode the extracted segment. In addition, in various embodiments, the one or more records from the storage medium may include data describing the particular segment and the one or more computing devices are configured to associate the data with the segment. In further embodiments, the one or more computing devices are configured to create a hyperlink to the particular media content and store the hyperlink along with the extracted segment. In addition, in further embodiments, the one or more computing devices are configured to create a thumbnail preview of the extracted segment and to store the thumbnail preview along with the extracted segment. In various embodiments, the thumbnail preview is constructed by extracting one or more frames of the segment and transcoding the one or more frames to a particular file format.

Further embodiments of the invention include a computer-implemented method for communicating a segment of media content with a user of an external system. In various embodiments, the method includes the steps of: (1) providing a plurality of records stored in a storage medium, wherein each record includes data that identifies a respective position of one of a plurality of segments in a particular media content and a storage location of the particular media content; (2) receiving a request over the network from the user for a particular segment of the particular media content; (3) retrieving one or more records from the storage medium associated with the particular segment based on the user's request; (4) obtaining the position of the particular segment in the particular media content from the retrieved one or more records; (5) obtaining the storage location of the particular media content from the retrieved one or more records; and (6) extracting the particular segment from the particular media content by utilizing the position and the storage location obtained from the retrieved one or more records to make the segment available to the user.

Furthermore, various embodiments of the invention include a computer-readable medium containing code executable by a processor for communicating a segment of media content with a user of an external system that includes one or more components. In various embodiments, these one or more components are adapted for: (1) receiving a request over the network from the user for a particular segment of the particular media content; (2) retrieving one or more records from the storage medium associated with the particular segment based on the user's request, wherein the one or more records include data that describes a respective position of the particular segment in the particular media content and a storage location of the particular media content; (3) obtaining the position of the particular segment in the particular media content from the retrieved one or more records; (4) obtaining the storage location of the particular media content from the retrieved one or more records; and (5) extracting the particular segment from the particular media content by utilizing the position and the storage location obtained from the retrieved one or more records to make the segment available to the user.

In further embodiments of the invention, a system is provided for providing a license over a network to a user to enable the user to observe the segment of media content. In various embodiments, the system includes a computing device configured to receive a request for the license over the network to enable the user to observe the segment of media content on a player device. In particular embodiments, the request includes a player identifier identifying the player device and a user identifier identifying the user.

In various embodiments, the computing device is configured to verify that the player device is associated with the user and to send a message including the user identifier to a billing system to confirm the user has rights to observe the segment of media content. Furthermore, in various embodiments, the computing device is configured to generate the license and to deliver the license to the player device in response to verifying the player device is associated with the user and to receiving confirmation from the billing system that the user has rights to observe the segment of media content.

In various embodiments, the request further includes a content identifier identifying the segment of media content. In these particular embodiments, the computing device is configured to send the message including the content identifier along with the user identifier to confirm the user has rights to observe the segment of media content.

In further embodiments of the invention, the request received for the license includes a certificate that indicates the user has rights to observe the segment of media content. Thus, the computer device in these embodiments confirms the authenticity of the certificate, and upon confirming the authenticity of the certificate generates the license and delivers the license to the player device.

Further embodiments of the invention provide a computer-implemented method for providing a license over a network to a user to enable the user to observe the segment of media content. In various embodiments, the method includes the steps of: (1) receiving a request for the license over the network to enable the user to observe the segment of media content on a player device, wherein the request includes a player identifier identifying the player device and a user identifier identifying the user; (2) verifying the player device is associated with the user; (3) sending a message including the user identifier to a billing system to confirm the user has rights to observe the segment of media content; and (4) in response to verifying the player device is associated with the user and to receiving confirmation from the billing system that the user has rights to observe the segment of media content: (a) generating the license; and (b) delivering the license to the player device, wherein the license is used by the player device to enable the user to observe the segment of media content on the player device.

In other embodiments, the method includes the steps of: (1) receiving a request for the license over the network to enable the user to observe the segment of media content on a player device, wherein the request includes a player identifier identifying the player device and a certificate that indicates the user has rights to observe the segment of media content; (2) verifying the player device is associated with the user; (3) confirm the authenticity of the certificate; and (4) in response to verifying the player device is associated with the user and to confirming the authenticity of the certificate: (a) generating the license; and (b) delivering the license to the player device, wherein the license is used by the player device to enable the user to observe the segment of media content on the player device.

Further embodiments of the invention include a computer-readable medium containing code executable by a processor for providing a license over a network to a user to enable the user to observe the segment of media content that includes one or more components. In various embodiments, these components are adapted for: (1) receiving a request for the license over the network to enable the user to observe the segment of media content on a player device, wherein the request includes a player identifier identifying the player device and a user identifier identifying the user; (2) verifying the player device is associated with the user; (3) sending a message including the user identifier to a billing system to confirm the user has rights to observe the segment of media content; and (4) in response to verifying the player device is associated with the user and to receiving confirmation from the billing system that the user has rights to observe the segment of media content: (a) generating the license; and (b) delivering the license to the player device, wherein the license is used by the player device to enable the user to observe the segment of media content on the player device.

In other embodiments, the components are adapted for: (1) receiving a request for the license over the network to enable the user to observe the segment of media content on a player device, wherein the request includes a player identifier identifying the player device and a certificate that indicates the user has rights to observe the segment of media content; (2) verifying the player device is associated with the user; (3) confirm the authenticity of the certificate; and (4) in response to verifying the player device is associated with the user and to confirming the authenticity of the certificate: (a) generating the license; and (b) delivering the license to the player device, wherein the license is used by the player device to enable the user to observe the segment of media content on the player device.

BRIEF DESCRIPTION OF THE DRAWINGS

Having thus described various embodiments of the invention in general terms, reference will now be made to the accompanying drawings, which are not necessarily drawn to scale, and wherein:

DETAILED DESCRIPTION OF THE INVENTION

The present invention now will be described more fully with reference to the accompanying drawings, in which some, but not all embodiments of the invention are shown. Indeed, this invention may be embodied in many different forms and should not be construed as limited to the embodiments set forth herein. Like numbers refer to like elements throughout.

As will be appreciated by one skilled in the art, the present invention may be embodied as a method, a data processing system, or a computer program product. Accordingly, the present invention may take the form of an entirely hardware embodiment, an entirely software embodiment, or an embodiment combining software and hardware aspects. Furthermore, the present invention may take the form of a computer program product on a computer-readable storage medium having computer-readable program instructions (e.g., computer software) embodied in the storage medium. More particularly, the present invention may take the form of web-implemented computer software. Any suitable computer-readable storage medium may be utilized including hard disks, CD-ROMs, optical storage devices, flash drives, or magnetic storage devices.

The present invention is described below with reference to block diagrams and flowchart illustrations of methods, apparatuses (e.g., systems and devices) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, a special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations for performing the specified functions, combinations of steps for performing the specified functions and program instructions for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Brief Overview

Various embodiments of the present invention provide systems, methods, and apparatus for tagging a segment of media content being observed by an individual. The segment of media content may include any number of types of content, such as cable programming, audio recordings, and electronic publications.

According to various embodiments, an individual observing media content may wish to tag a segment of media content to capture. For example, the individual may be watching a cable program and may wish to tag a segment of the program to capture for later retrieval. In various embodiments, the individual presses a button on an input device, such as a remote control, to send one or more inputs to a tag module. For example, this module may be located in the individual's settop box providing a cable signal to the individual's television.

In response, a first identifier indicating a beginning location in the media content and a second identifier indicating an ending location in the media content are recorded. In various embodiments, the beginning location is a predetermined offset position prior to a certain position in the media content when the individual presses the button. The ending location is a predetermined offset position after the certain position in the cable program when the individual presses the button.

Furthermore, in various embodiments, data is sent that includes the first and second identifier to be stored in storage medium wherein the data is used to subsequently identify the segment of the original media content. In addition, in various embodiments, the storage location of the original media content is also stored along with the data. Thus, in various embodiments, the storage medium contains a plurality of records, wherein each record includes data that identifies a respective position of one of a plurality of segments in particular media content and a storage location of the particular medium content. Thus, in various embodiments, this data is used to retrieve particular media content and extract a particular segment from the media content.

Furthermore, various embodiments provide systems and methods for communicating a segment of media content with a user of an external system. In particular embodiments, a search engine is provided to the external system that is configured to be used by the user to search the plurality of records in the storage medium to identify a particular segment to observe. For example, the search engine may be a webpage providing the user with a listing of the available segments of cable programs.

The user selects a particular segment to observe and a request for the particular segment is sent. In response, one or more records are retrieved from the storage medium associated with the particular segment. The position of the segment in the original media content and the storage location of the original media content are obtained from the one or more records and the particular segment is extracted from the media content by utilizing the position and the storage location to make the segment available to the user of the external system.

In addition, further embodiments provide systems and methods for providing a license over a network to a user to enable the user to observe a segment of media content. In these particular embodiments, a request is received for the license over the network to enable a user to observe the segment of media content on his player device. In various embodiments, the request includes a player identifier identifying the player device and a user identifier identifying the user.

According to various embodiments, the player device is verified to be associated with the user and a message that includes the user identifier is sent to a billing system to confirm the user has rights to observe the segment of media content. In response to verifying the player device is associated with the user and to receiving confirmation from the billing system that the user has rights to observe the segment of media content, the license is generated and is delivered to the player device to be used to observe the segment of media content on the player device.

In alternative embodiments, the request includes a certificate that indicates that the user has rights to observe the segment of media content instead of the user identifier. In these particular embodiments, the certificate is authenticated and as a result, the license is generated and is delivered to the player device.

System Architecture

Figure 1:
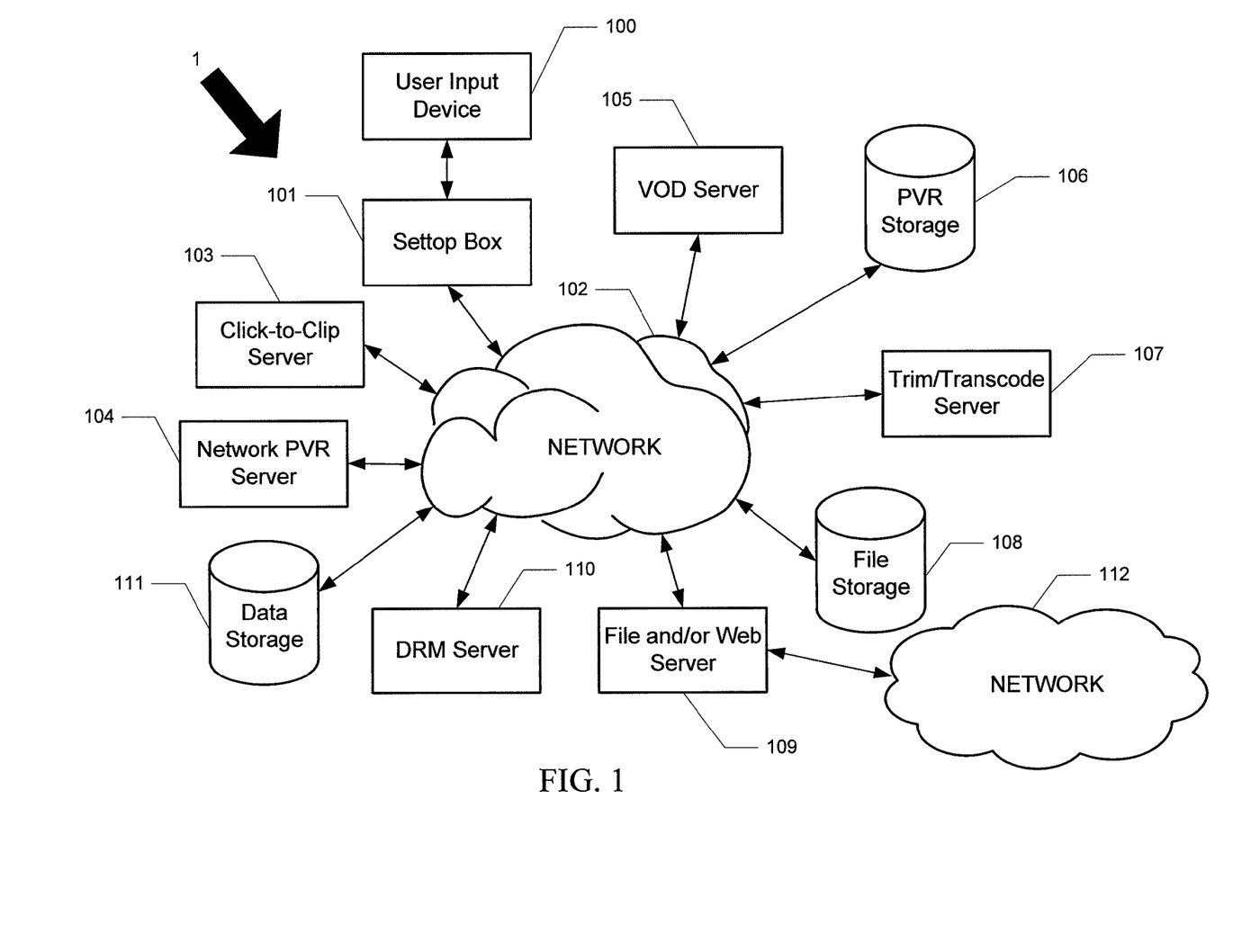
FIG. 1 is a schematic diagram illustrating a media content providing system according to various embodiments of the invention.

A media content providing system 1 according to various embodiments of the invention is shown in FIG. 1. In various embodiments, this system 1 may be considered a closed content system. For example, the system 1 may be a cable provider's system 1 providing cable programming to the cable provider's subscribers.

As may be understood from this figure, in various embodiments, the system 1 includes a settop box 101. The settop box 101 is a device that is used by individual to receive a digital cable signal for a television. For example, the settop box 101 may be a device, such as a personal video recorder (PVR) provided by a cable company. The PVR receives the digital cable signal and feeds the signal into an individual's television set so that the individual can view the cable company's cable television programming.

However, the settop box 101 does not necessary need to be a digital cable box for a television. For instance, in other embodiments, the settop box 101 may be a device configured to receive a digital music signal and provides the signal to an individual's audio system. While in other embodiments, the settop box 101 may be a device configured to simply receive radio signals or standard television signals. Furthermore, in other embodiments, the settop box 101 may be a computing device, such as an individual's desktop computer or laptop computer, configured to receive media signals over a network.

In addition, the system 1 according to various embodiments includes a user input device 100. The user input device 100 is configured to be used by the individual to input information (such as commands or commentary) into the settop box 101. For example, the user input device 100 may be a remote control for the settop box 101. While in other embodiments, the user input device 100 may be a keyboard, a touch screen, or other wireless device such as a PDA, a Blackberry® or an iPhone®.

Furthermore, the system 1 of various embodiments may also include a click-to-clip server 103, a network PVR server 104, a video on demand (VOD) server 105, a trim/transcode server 107, a file and/or web server 109, and a digital rights management (DRM) server 110. In various embodiments, these servers are configured to perform specific functions within the system 1. For instance, as will be described in further detail below, the click-to-clip server 103 is configured to work in conjunction with the settop box 101 to tag and to capture data associated with segments of media content, and to store the data so that the segments can be retrieved from the media content.

The network PVR server 104 is configured to serve as a personal video recorder unit for a number of users within the system 1. The VOD server 105 is configured to provide video on demand features to the users of the system 1. These servers 104, 105 are typically found in many digital cable providers' systems.

The trim/transcode server 107, as will be described in further detail below, is configured to trim and/or transcode segments of media content, on request, so that the segments may be posted to the system 1 and/or external systems. The file and/or web server 109, in various embodiments, is configured to serve as an interface between the system 1 and the various external systems. For instance, the file and/or web server 109 may provide users in the external systems with web pages that allow the users to search for and request segments of media content within the system 1. In various embodiments, the file and/or web server 109 communicates with such external systems over a network 112, such as the Internet. Furthermore, in various embodiments, the DRM server 110 is configured to provide licenses over the network 112, as required, for any requested segments by the users in the external systems so that the users may observe the requested segments. Several of these components of the system 1 are connected via a network 102 within the media content providing system 1 (e.g., a LAN, the Internet, a wireless network, and/or a private network) and communicate with one another.

In addition, as depicted in FIG. 1, the system 1 also includes various storage medium, such as PVR storage 106, file storage 108, and data storage 111. These storage medium 106, 108, 111 are also connected via the network 102 and communicate with other components of the system 1. The PVR storage 106 stores information associated with individuals' personal video recordings. In various embodiments, this information may be sent from individuals' settop boxes 101 and/or the network PVR server 104. This information may include individuals' settings for recording media content within the system 1 and/or may include individuals' actual recorded media content. In various embodiments, the file storage 108 stores segments of media content that have been trimmed and/or transcoded. Furthermore, in various embodiments, the data storage 111 stores the original media content.

In various embodiments, the components 100, 101, 103, 104, 105, 106, 107, 109, 110 may be one or more devices or software programs running on one or more devices. Furthermore, in various embodiments, the storage medium 106, 108, 111 may be one or more types of medium such as hard disks, magnetic tapes, or flash memory.

Exemplary Settop Box

Figure 2:
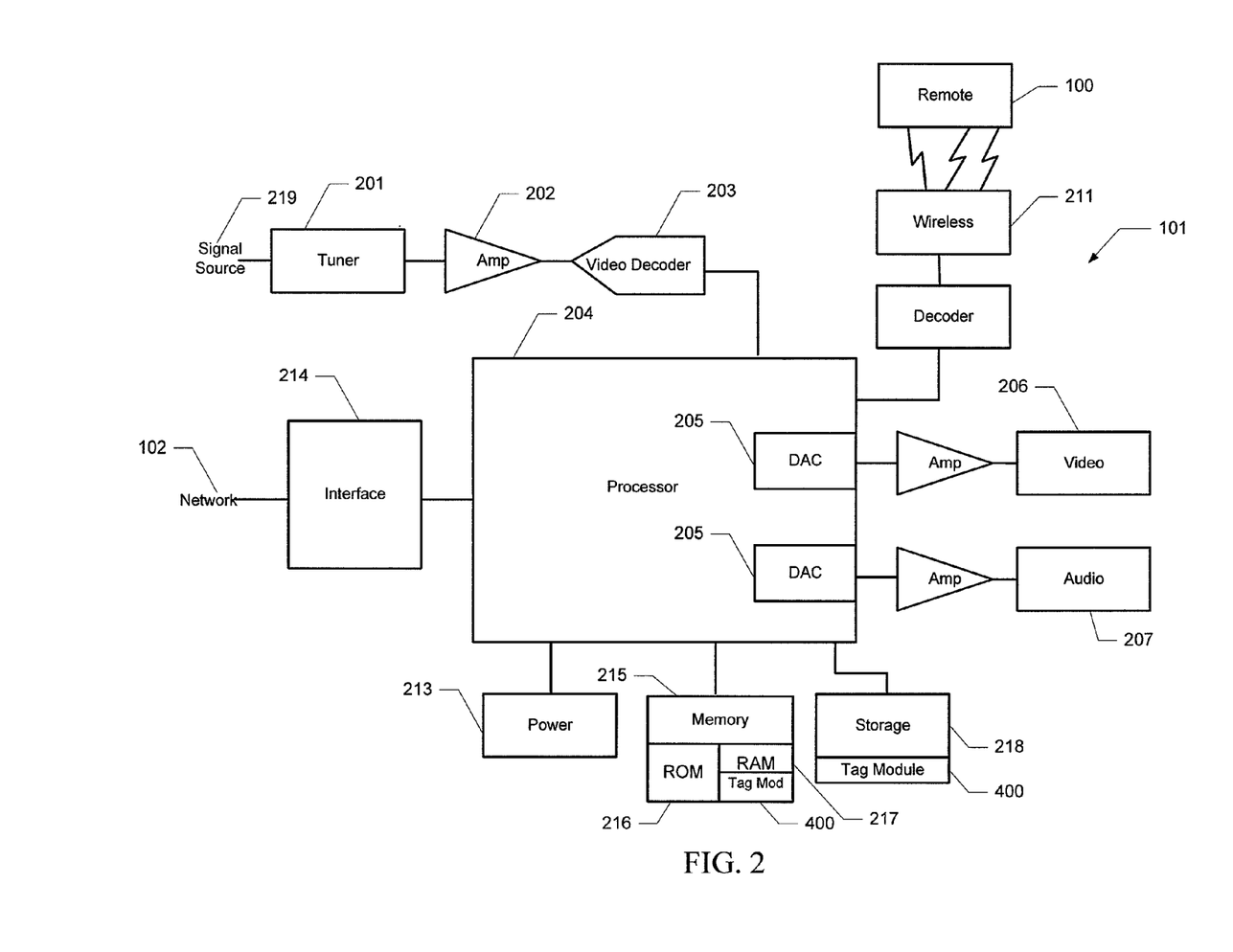
FIG. 2 is a schematic diagram illustrating a settop box residing in the media content providing system shown in FIG. 1 according to various embodiments of the invention.

FIG. 2 shows a schematic diagram of a settop box 101 according to one embodiment of the invention. The particular settop box 101 depicted in FIG. 2 is configured to receive a digital signal from a cable company and to convert the signal into audiovisual content that is typically displayed on a television. However, as noted above, the settop box 101 is not limited to a device used to receive a digital signal from a cable company. For example, the settop box 101 may be a device configured to receive a digital music signal from a satellite radio provider. Thus, the settop box depicted in FIG. 2 is for illustrative purposes only, and in on way should be construed to limit the scope of the invention.

The particular embodiment of the settop box 101 shown in FIG. 2 includes a processor 204 and storage 218, such as a hard disk drive and/or a flash drive, on which audiovisual data may be recorded and stored by the processor 204. In addition, the settop box 101 further includes memory 215 composed of both read only memory (ROM) 216 and random access memory (RAM) 217.

The settop box 101 further includes a tuner 201 configured to receive the incoming source signal 219. The tuner 201 sends the source signal 219 through an amplifier 202 and a video decoder 203 configured to translate the encoded source signal 219 into its original format. The video decoder 203 directs the translated source signal 219 to the processor 204.

In various embodiments, the processor 204 may also include a digital-to-analog converter (DAC) 205 configured to convert the translated source signal 219 from a digital signal to an analog signal if the television will only read an analog signal. Furthermore, the processor is configured to feed the translated signal to the video and audio outputs 206, 207 of the settop box 101 that are connected to the television.

In addition, the settop box 101 may also include a wireless interface 211 that is configured to receive commands (and/or commentary) from the individual via transmission from a remote control 100. The remote control 100 may transmit such commands using any number of transmitters, such as a radio frequency transmitter, a supersonic transmitter, or an optical transmitter.

A number of program modules may also be stored within the storage 218 and/or within RAM 217 of the settop box 101. For example, a tag module 400 may be stored within the storage 218 and/or RAM 217. The tag module 400 may be used to control certain aspects of the operation of the settop box 101, as is described in more detail below, with the assistance of the processor 204.

Also located within the settop box 101 is an interface 214, for interfacing and communicating with other elements of a network (such as the network 102 discussed in the media content providing system 1 described above.) It will be appreciated by one of ordinary skill in the art that one or more of the settop box's 101 components may be located geographically remotely from other settop box 101 components. Furthermore, one or more of the components may be combined, and additional components performing functions described herein may also be included in the settop box 101.

Exemplary Server

Figure 3:
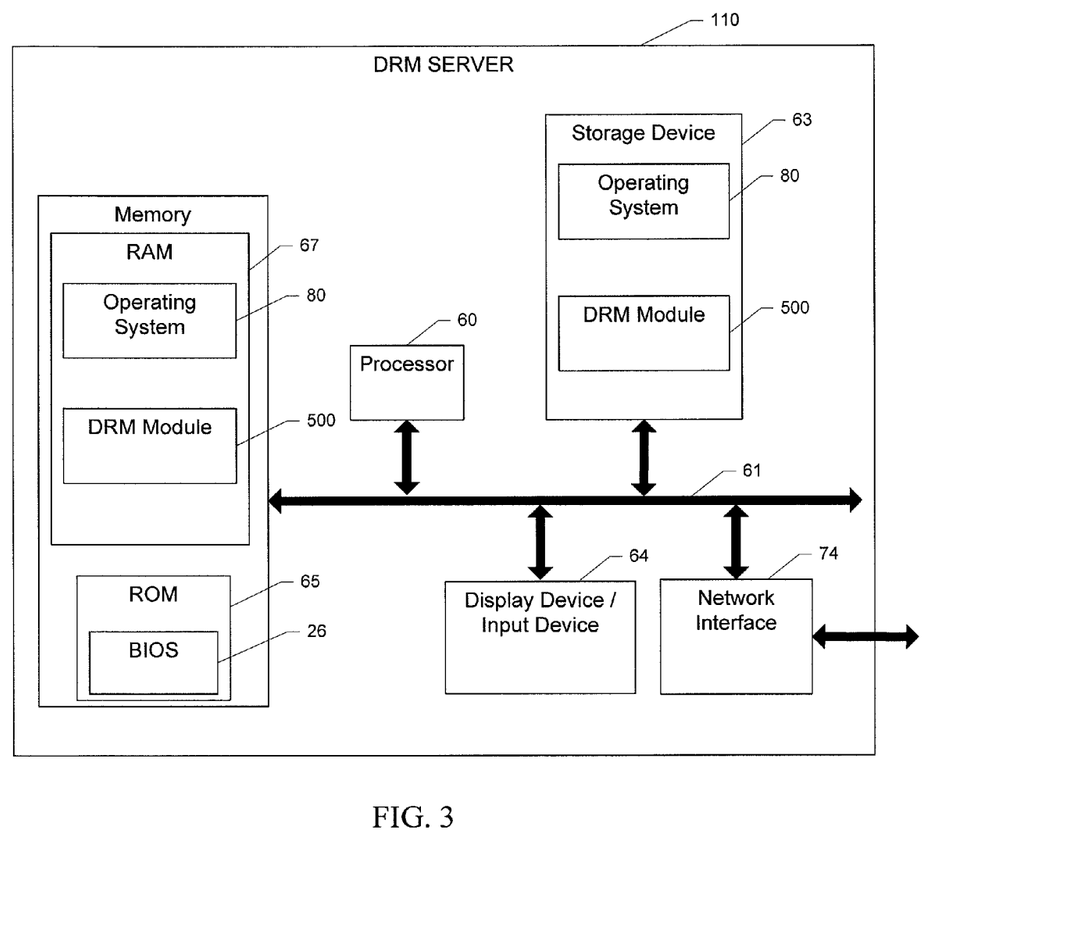
FIG. 3 is a schematic diagram illustrating a server residing in the media content providing system shown in FIG. 1 according to various embodiments of the invention.

FIG. 3 shows a schematic diagram of one of the servers in the media content providing system 1 depicted in FIG. 1 according to one embodiment of the invention. For example, the server may be the click-to-clip server 103, the VOD server 105, or the DRM server 110 shown in FIG. 1. The server 103, 105, 110 includes a processor 60 that communicates with other elements within the server 103, 105, 110 via a system interface or bus 61. Also included in the server 103, 105, 110 is a display device/input device 64 for receiving and displaying data. This display device/input device 64 may be, for example, a keyboard or pointing device that is used in combination with a monitor. The server 103, 105, 110 further includes memory 66, which preferably includes both read only memory (ROM) 65 and random access memory (RAM) 67. The server's ROM 65 is used to store a basic input/output system 26 (BIOS), containing the basic routines that help to transfer information between elements within the server 103, 105, 110. Alternatively, the server 103, 105, 110 can operate on one computer or on multiple computers that are networked together.

In addition, the server 103, 105, 110 includes at least one storage device 63, such as a hard disk drive, a floppy disk drive, a CD Rom drive, flash drive, or optical disk drive, for storing information on various computer-readable media, such as a hard disk, a removable magnetic disk, or a CD-ROM disk. As will be appreciated by one of ordinary skill in the art, each of these storage devices 63 is connected to the server bus 61 by an appropriate interface. The storage devices 63 and their associated computer-readable media provide nonvolatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 67. For example, as shown in FIG. 3, program modules of the DRM server 110 may include an operating system 80 and a digital rights management module 500. The digital rights management module 500 may be used to control certain aspects of the operation of the DRM server 110, as is described in more detail below, with the assistance of the processor 60 and an operating system 80.

Also located within the server 103, 105, 110 is a network interface 74, for interfacing and communicating with other elements of one or more networks (such as the networks 102, 112 described in media content providing system 1 depicted in FIG. 1.) It will be appreciated by one of ordinary skill in the art that one or more of the server's 103, 105, 110 components may be located geographically remotely from other server 103, 105, 110 components. Furthermore, one or more of the components may be combined, and additional components performing functions described herein may be included in the system 1.

Exemplary System Operation

As mentioned above, the system 1 according to various embodiments provides for tagging and communicating segments of media content within a closed content network and outside the closed content network. In various embodiments, the term "tagging" means to identify a segment of media content. For example, tagging may entail identify a portion of a video by identifying a beginning location in a video and an ending location in the video to "tag" the portion of the video that lies between the two locations. In addition, the system 1 according to various embodiments provides licenses over one or more networks for the segments of media content so that individuals on the networks can observe the segments of media content.

In particular embodiments, the settop box 101 of the system 1 includes a tag module 400. This module 400 is configured to tag a segment of media content being observed and provide data indicating the position of the segment within the media content. The trim/transcode server 107 includes a module 500 for communicating a segment of media content with one or more individuals (e.g., users) of an external system. This module 500 is configured to locate media content, to trim and/or transcode a segment of the media content, as needed, and to share the segment of media content with an external system. Furthermore, the DRM server includes a DRM module 600. This module 600 is configured to provide licenses for segments of media content over one or more networks. These modules 400, 500, 600 are described in more detail below.

Tag Module

Figure 4:
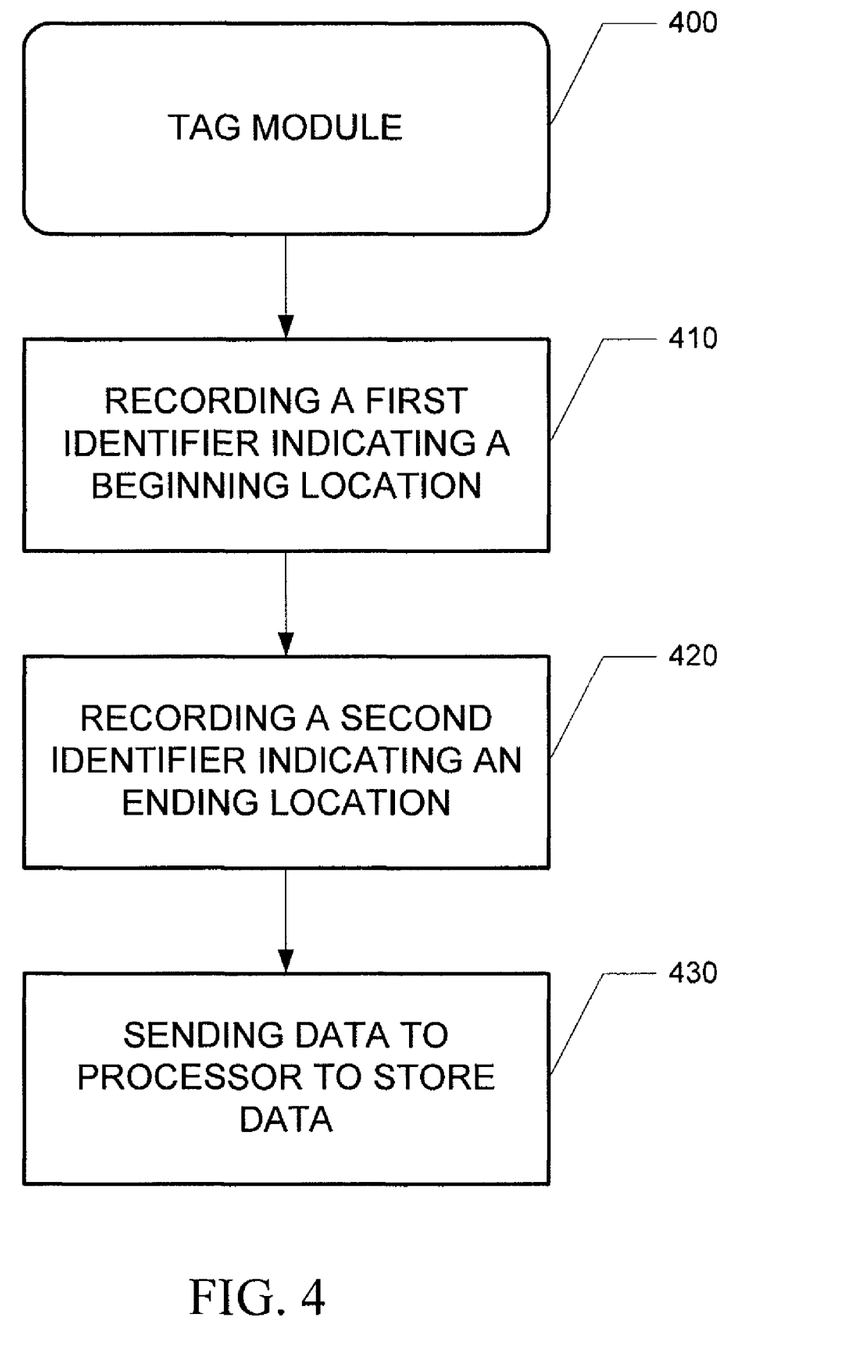
FIG. 4 is a flow diagram of a tag module according to various embodiments of the invention.

FIG. 4 illustrates a flow diagram of the tag module 400 according to various embodiments. This flow diagram may correspond to the steps carried out by the processor 204 in the settop box 101 shown in FIG. 2 as it executes the module 400 in the box's 100 RAM memory 217 according to various embodiments.

In various embodiments, an individual observes media content that is received at the individual's settop box 101. For example, the individual views a cable program on his television set, wherein the signal for the cable program is received by the settop box 101 and the signal is converted by the settop box 101 and sent to the individual's television. In another example, the individual may, instead, be listening to music that is received at the individual's settop box 101. The settop box 101 receives a signal for the music and converts the signal and outputs the converted signal to the user's audio system, such as a stereo, a satellite radio, and/or surround sound system. Thus, the settop box 101 may receive any number of types of media content. However, for purposes of this disclosure, the example wherein the settop box 101 receives a cable programming signal is used. Thus, the settop box 101 is aware of the cable program being played on the individual's television and the time code within the cable program. The time code is a digitally encoded signal that is recorded on visual media to identify each frame of the media. Typically, the time code identifies the frame by hour, minute, second, and frame number.

In addition, in various embodiments, the user input device 100 is provided with a mechanism to provide one or more inputs to the tag module 400. For example, in one embodiment, a button is provided on the remote control unit 100 for the settop box 101 that is selected by the individual to send a command to the module 400. In other embodiments, the user input device 100 may be a keyboard or a touch screen, and the individual selects one or more keys on the keyboard or one or more areas on the touch screen to send one or more inputs to the module 400.

Thus, the individual is watching a cable program and views a segment of the program that the individual is interested in sharing with family, friends, and/or the public. The individual "tags" the segment of the program by pressing the button on the remote control 100 to send a command to the tag module 400. In response, the module 400 records a first identifier indicating a beginning location in the cable program being viewed by the user, shown as Step 410. In one embodiment, the beginning location is simply the time code within the cable program at the moment the individual presses the button on the remote control 100.

Further, in Step 420, the module 400 records a second identifier indicating an ending location in the cable program when the individual releases the button on the remote control 100. This ending location is the time code within the cable program at the moment the individual releases the button on the remote control 100.

In an alternative embodiment, the beginning location is a predetermined offset position prior to a certain position (e.g., time code) in the cable program when the individual presses the button on the remote control 100. For example, the predetermined offset position may be set to a certain amount of time (e.g., ten seconds) in the program prior to the individual pressing the button on the remote control. This provides the advantage of allowing the individual to mark a segment of the cable program that the individual has just viewed without having to rewind the program.

Furthermore, in this particular embodiment, the ending location is a predetermined offset position after the certain position in the cable program when the individual presses the button on the remote control 100. For example, the predetermined offset position can be set to thirty seconds in the program after the individual has pressed the button. Thus, the individual can mark the beginning location and the ending location in the cable program with one click of the button on the remote control 100. In various embodiments, this process is referenced to as click-to-clip.

In Step 430, the module 400 sends data that includes the first identifier and the second identifier to one or more devices, the devices, in turn, store the data in one or more storage medium. For instance, in one embodiment, the module 400 sends the data to the settop box processor 204 and the processor 204 stores the data in the storage 218 in the settop box 101. In another embodiment, the module 400 sends the data (e.g., a message) to a server located within the media content providing system 1. For example, the module 400 sends the data to the click-to-clip server 103 in the system 1 previously discussed. The server 103 then saves the data to one or more storage medium located within the system 1, such as the PVR storage 106 or the file storage 108.

The data sent by the module 400 may include various types of information. For instance, in one embodiment, the data may include channel data, such as a program descriptor, asset identifier, or the channel currently in tune, indicating what cable program the individual is currently viewing along with the first identifier (e.g., a start time code) and the second identifier (e.g., an end time code). In addition, in another embodiment, the data may also include a unique identifier that is associated with the individual such as username or subscriber identifier. In another embodiment, this unique identifier may be obtained by the server 103 after receiving the data from the module 400 by cross-referencing the MAC address of the settop box 101 with a record previously stored that associates the MAC address with a particular subscriber or subscriber identifier.

In various embodiments, the settop box processor 204 and/or server 103 parses the data prior to storing it so that the data is retrievable at a later time. In addition, the processor 204 and/or server 103 may obtain and store additional information along with the data received from the tag module 400. For example, the processor 204 and/or server 103 may obtain metadata that pre-exists in the system 1 (such as program name and/or description from an electronic program guide) or information entered by the individual pertaining to the particular segment of the cable program.

For instance, the individual may wish to add commentary to the segment. This commentary may be embedded into the segment of cable program and/or appended to the segment of cable program at a later time when the segment is retrieved from the cable program.

In one embodiment, the individual enters this commentary at the time the data for the segment is recorded by the tag module 400 and the module 400 sends this commentary along with the data to the processor 204 and/or server 103. In another embodiment, the individual enters commentary via an input device on the system 1 after the data has been initially stored. For example, the individual may use an onscreen keyboard and/or a module running on the individual's settop box 101 that allows the individual to scroll through saved segments of media content and add commentary to selected segments. In addition, the individual may access saved segments on the system 1 via one or more web pages provided by the cable provider that allows the individual to add commentary to one or more saved segments.

Furthermore, the processor 204 and/or server 103 may store the location of the original cable program along with the data received from the tag module 400. For instance, in the case in which the system 1 contains a network PVR server 104, this server 104 records all of the programs for the entire channel map for the system 1 in the data storage 111 and is aware of the location of the recording that it is creating. Thus, the processor 204 and/or server 103 obtain the location of the cable program corresponding to the received data from the network PVR server 104 and store the location along with the data. In the case of a PVR enabled settop box 101, the settop box 101 may upload the cable program to a server within the system 1 to be stored in the data storage 111. Thus, the server is aware of the location of the stored cable program. The location may be stored directly with the data or as separate data that is associated with the segment data via the program identifier.

In addition, in further embodiments, a thumbnail image is automatically created and stored along with the data sent by tag module 400. This thumbnail may be created by various processes such as converting a frame of the cable program into a separate file with its own formant (such as JPEG or PNG).

Once the data has been saved to storage, the data can be used to identify the segment of the cable program original tagged by the individual for viewing. For instance, a listing of the segments may be made available to other subscribers in the media content providing system 1 via the video-on-demand (VOD) server 105. A subscriber may access the VOD server 105 through his personal settop box 101. The VOD server 105 displays a listing of the available segments of cable programs by constructing the list of segments from the data saved for the various segments sent by subscribers through their personal settop boxes 101. Thus, the data may be indexed and made available for searching by any number of available processes.

The subscriber selects a particular segment to view and the VOD server 105 retrieves the data associated with the particular segment from the PVR storage 106. The VOD server 105 then retrieves the original cable program from the data storage 111. For example, in one embodiment, the VOD server 105 reads the location of the original cable program from the retrieved data and retrieves the cable program from the particular storage location. The VOD server 105 then reads the first and second identifiers from the data and locates the beginning and the ending locations in the cable program based on the identifiers. Finally, the VOD server 105 identifies (e.g., extracts) the segment from the cable program that includes the content between the beginning location and the ending location and plays the retrieved segment for the subscriber by streaming the segment through the subscriber's settop box 101 to the subscriber's television.

In alternative embodiment, the segments of cable programs are only stored locally on the individual's personal settop box 101. In this case, the processor 204 of the box 101 displays the listing of available segments to the individual (or to another individual using the particular settop box 101 or accessing the particular settop box 101) and the individual selects the desired segment from the listing to view. The processor 204 then identifies the desired segment from the cable program in a similar fashion as the VOD server 105 discussed above and plays the identified segment for the individual.

Furthermore, as will be described in more detail below, the identified segments of cable programs may be made available outside the media content providing system 1 (e.g., cable provider's system). For example, the system 1 may provide a search engine to one or more external systems wherein the search engine may be used by individuals in the external systems to search the available segments (e.g., one or more web pages available over the Internet). These individuals may select one or more desired segments from the engine to view and the system 1 retrieves the selected segments and makes them available for these individuals to view.

Module for Communicating a Segment of Media Content

As previously discussed, in various embodiments, the segments of media content tagged by individuals in a closed content network may also be communicated to external networks that lie outside the closed content network. For example, a subscriber of a cable provider may tag a segment of a cable program and make the segment of the cable program available on one or more websites via the Internet. Individuals may then visit the website, request to view the segment, and various embodiments of the invention make the segment available to the individuals for viewing.

Figure 5:
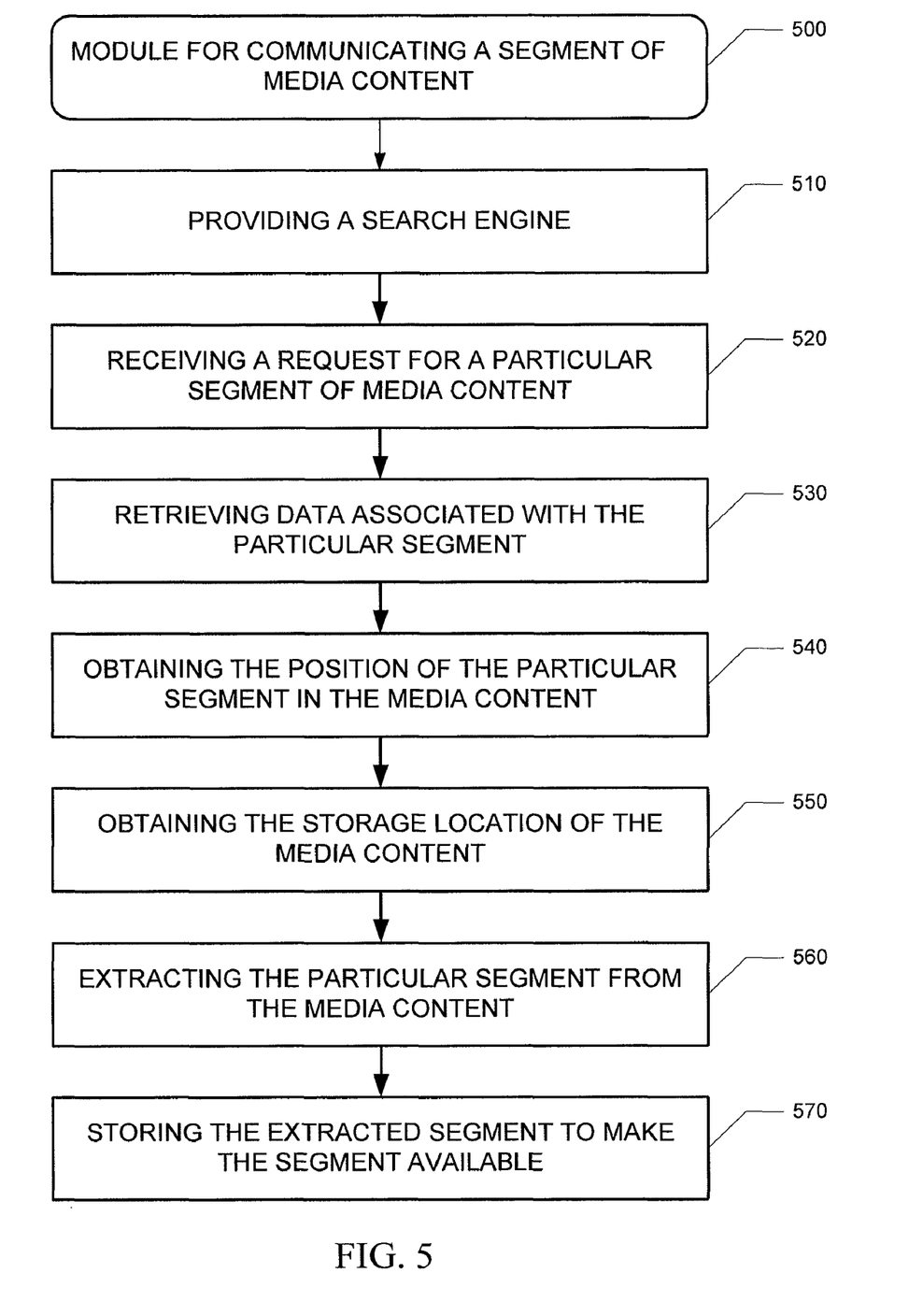
FIG. 5 is a flow diagram of a module for communicating a segment of media content with a user in an external network according to various embodiments of the invention.

Accordingly, FIG. 5 illustrates a flow diagram of a module 500 for communicating a segment of media content with one or more individuals (e.g., users) of an external system according to various embodiments. This flow diagram may correspond to the steps carried out by the processor in the trim/transcode server 107 shown in FIG. 1 as it executes the module 500 in the server's RAM memory according to various embodiments.

In Step 510, the module 500 provides a search engine to the external system. In various embodiments, this search engine is configured to allow individuals of the external system to search the segments of media content identified by individuals in the closed content network. For example, the search engine allows individuals of the external system to search the segments of cable programs identified by individuals via their settop boxes 101 and the tag module 400.

The module 500 may provide the search engine via several mechanisms in various embodiments. For instance, in one embodiment, the module 500 provides an indexed list of the segments of cable programs to the file and/or web server 109 shown in FIG. 1. This indexed list may be constructed from the information in the segment data stored in the system 1, as discussed above. For example, the indexed list may be constructed based on the program name, start time code, and end time code of the segments of cable programs. Other information may include, for example, the air date for the segment and/or the performers associated with the particular media content. In addition, the list is preferably indexed so that it is searchable.

The file and/or web server 109 provides the indexed list in one or more interfaces and posts the interfaces to make them available to the external system. For example, the file and/or web server 109 provides the list in a webpage and posts the webpage to the Internet 112. Thus, an individual on the Internet 112 can visit the webpage and search the list and identify a desired segment of a cable program to view. It should be noted that the segment of media content may include the entire media content. For instance, the individual may request to view the entire cable program.

The individual requests to view the desired segment by selecting the segment from the list on the webpage. In turn, the request is sent back over the Internet 112 and the module receives the request, shown as Step 520.

The request may include information in addition to identifying the desired segment of media content. For instance, in one embodiment, the request may also indicate whether the segment needs to be trimmed and/or transcoded into a different format. It may be the case that the individual who has submitted the request only wants to view a portion of the segment of media content. In addition, it may be the case that the segment needs to be transcoded from its original format to a different format so that the individual can observe the segment on his particular media player. Thus, the trim/transcode server 107 of various embodiments is configured to perform these tasks based on the request received from the individual.

In response to receiving the request from the individual, the module 500 retrieves the data (e.g., a record) associated with the particular segment from the storage medium 106, 108 in the system 1, shown as Step 530. Thus, returning to the example wherein the segment of media content represents a segment of a cable program, the module 500 retrieves the data associated with the particular segment of the cable program.

In Step 540, the module 500 then obtains the position of the particular segment in cable program. For instance, the module 500 extracts the first and second identifiers from the data that identifies the beginning and the ending locations within the cable program that define the particular segment. In addition, the module 500 obtains the storage location of the original cable program from the data, shown as Step 550. As previously discussed, this storage location may exist anywhere within the system 1 (such as the data storage 111). Thus, according to various embodiments, the module 500 may copy the cable program from the storage location to the trim/transcode server 107 or may simply access the cable program at the storage location.

The module 500 extracts the particular segment from the cable program by utilizing the position of the segment in the cable program and the storage location of the cable location to make the segment available to the individual who originally requested the segment, shown as Step 560. Thus, for example, in one embodiment, the module 500 extracts the content from the cable program that lies between the first identifier and the second identifier.

In various embodiments, the term "extract" means to simply stream the segment of the media content out to the individual. For instance, in the case of the cable program, the original program is not altered in any way and the requested segment of the program is streamed to the individual.

In other embodiments, the term "extract" means to generate a copy of the segment from the original media content.

Thus, in Step 570, the module 500 stores the extracted segment to make the segment available to the individual who originally requested the segment. In one embodiment, the module 500 saves the extracted segment to one more storage medium within the system 1, such as the PVR storage 106 and/or the file storage 108. In addition, the module 500 may provide permission for the segment so that the individual can access the segment via the website and view the segment. In another embodiment, the module 500 exports the segment to the external system so that the individual can access and view the segment on the external system.

Furthermore, in various embodiments, the module 500 may also save information obtained from the retrieved data for the particular segment along with the extracted segment. According to various embodiments, this information may be used to create hyperlinks from the extracted segment to the original media content.

In the case wherein the request includes information indicating that the segment needs to be transcoded, the trim/transcode server 107 (via the module 500 configured to share the segment or via a separate module) invokes a process to transcode the extracted segment into a different format. In addition, if the new format has the ability to embed metadata into the segment and/or to append metadata to the segment, the server 107 inserts such data into the segment and/or appends such data to the segment as available within the data retrieved for the particular segment. Thus, commentary provided for the segment may be inserted into the segment and/or appended to the segment prior to making the segment available to the individual in the external system. Similarly, in the case wherein the request includes information indicating that the segment need to be trimmed, the trim/transcode server 107 invokes a process to trim the extracted segment.

In various embodiments, the request may further include the desire for a thumbnail preview of the segment. In such a case, the module 500 is further configured to extract one or more frames from the segment and convert or transcode the frames into a file in a requested image format. This thumbnail image may be stored along with the extracted segment and/or along with the data associated with the extracted segment.

Furthermore, in various embodiments, the request may indicate the desire for a "mashup" of various segments of media content. Thus, the trim/transcode server 107 (e.g., the module 500) is configured to perform any required trimming and/or transcoding operation on the various segments and then to stitch the various clips of the segments together. This results in a derived file that contains content of multiple segments. In various embodiments, the module 500 may also create hyperlinks from these files to the original media content.

In addition, as will be described in further detail below, the system 1 may include additional modules configured to insert digital rights into the extracted segments of media content. Further, the system 1 may include additional modules configured to limit the number of segments that may be derived from the same original media content or to insert or to append advertising into the extracted segments.

Thus, the module 500 of various embodiments, as describe above, allows for the segments of media content identified via the tag module 400 to be separated from the original media content so that the segments can be access via various mechanisms. For example, the extracted segments can be published to make the segments available to individuals in external systems (e.g., "pushed" to a website or allow individuals of external systems to "pull" from the media content providing system 1).

Digital Rights Management (DRM) Module

In various embodiments, the media content from which the segments are derived may be copyright protected. For example, in the case of the media content being cable programming, the individual cable programs (e.g., television shows) may be copyright protected so that only subscribers of the programming are authorized to view the cable programs (e.g., the subscribers have purchased a license to view the cable programs via their monthly subscription fee paid to the cable provider). Therefore, these segments cannot be shared outside the cable provider's closed content system 1 without violating copyright laws. In various embodiments, the digital rights management (DRM) module provides a solution to this problem. In particular, this module 600 according to various embodiments provides a mechanism through which rights can be extended to systems external to the closed content system 1.

Figure 6:
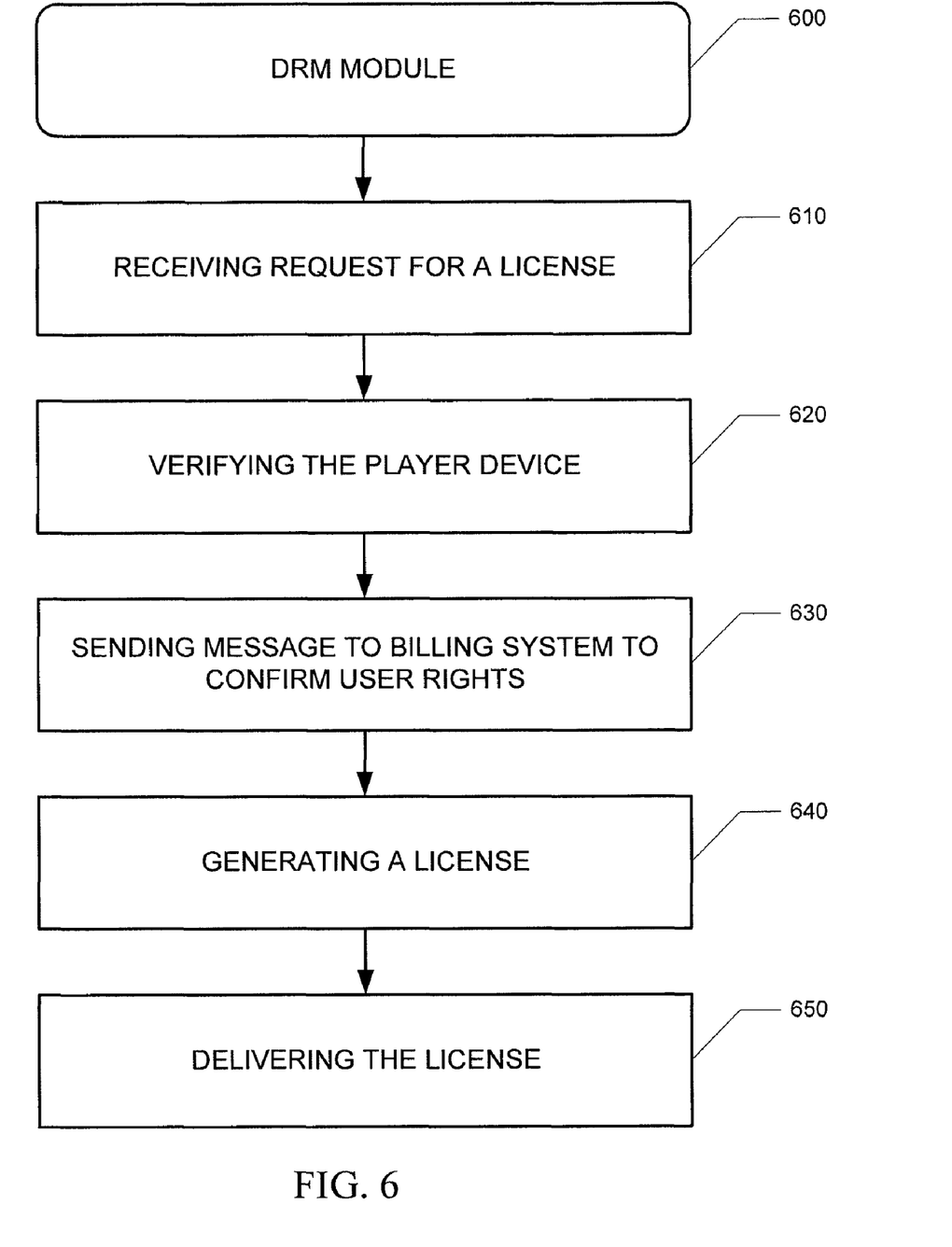
FIG. 6 is a flow diagram of a digital rights management (DRM) module according to various embodiments of the invention.

FIG. 6 illustrates a flow diagram of the DRM module 600 according to various embodiments. This flow diagram may correspond to the steps carried out by the processor in the DRM server 110 shown in FIG. 1 as it executes the module 600 in the server's RAM memory according to various embodiments.

In various embodiments, The DRM server 110 receives a request from an individual to observe a segment from particular media content. (In various requests, the segment may be the entire media content.) Therefore, returning to the example discussed above, the individual selects a desired segment of a cable program over the Internet 112 from a listing provided on a webpage from the system 1. As previously discussed, in various embodiments, the system 1 extracts the segment from the original cable program and makes the segment available to the individual to view. In turn, the individual clicks on the available segment to view and the individual's media player, such as Windows® Media or Adobe® Media Player, opens. Accordingly, the media player opens the link associated with the available segment to invoke the segment to play.

In various embodiments, the media player recognizes that a license is required to play the segment of media content. Thus, in the example, the cable provider encrypts the segment of the cable program and the media player recognizes that a license must be obtained from the cable provider in order to decrypt the segment to view the segment. As a result, the media player contacts the cable operator's DRM server 110 over the Internet 112 to request the license, and the DRM module 600 receives the request, shown as Step 610.

The request may include several pieces of information according to various embodiments. For instance, the request may include a player identifier identifying the media player device and user identifier identifying the individual who request to view the segment. The request may also include an identifier identifying the segment and/or media content.

In response, the DRM module 600 verifies the media player device is associated with the individual, shown as Step 620. The module 600 may accomplish this step according to various methods. For example, the module 600 may query a database of information that includes registered media players using the player identifier and the user identifier received in the request from the media player.

In addition, in Step 630, the DRM module 600 sends a message to the cable provider's billing system to confirm that the individual has the right to view the segment of the cable program. Thus, in one embodiment, the message includes the user identifier provided in the request, and the billing system confirms that the individual is a subscriber in good standing with the cable provider. In another embodiment, the message also includes the identifier for the segment and/or media content so that the billing system can confirm that the individual has rights for the particular media content. For example, the particular media content may be a program aired on a paid channel, such as HBO®. Thus, the billing system confirms that the particular individual is a subscriber to the particular paid channel.

The DRM module 600, in response to verifying the media player device is associated with the individual and to receiving confirmation that the individual has rights to view the segment of the cable program, generates a license for the segment, shown as Step 640. In various embodiments, this license may be associated directly with the individual's media player so that the license can only be used in conjunction with the media player. In addition, in various embodiments, the module 600 may include in the license any other restrictions placed on the use of the license, such as license duration (e.g., the module 600 may include a restriction placing a predetermined period of time in which the individual can view the segment on his player). Finally, in Step 650, the DRM module 600 delivers the license to the individual's media player to enable the individual to view the segment on his media player.

In alternative embodiment, the DRM module 600 also provides a license to an individual who is not a subscriber of the cable provider. Thus, the individual may have purchased rights to view the segment through a different source. For example, the individual may have purchased rights to view the segment from a media source such as iTunes®. The alternate source provides the individual with some type of verification that the individual has purchased rights, such as an electronic certificate. In turn, the individual's media player provides the certificate in the request for a license sent to the cable provider's DRM server 110. In this case, the DRM module 600 does not send a message to the cable provider's billing system to confirm the individual's rights but confirms the authenticity of the certificate. For example, the DRM module 600 may contact the source that provided the certificate to verify that the individual has indeed purchased rights to view the segment of the cable program. As a result of confirmation that the certificate is authentic, the DRM module 600 generates the license and delivers the license to the individual's media player.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended listing of inventive concepts. Although specific terms are employed herein, they are used in a generic and descriptive sense only and not for purposes of limitation.

What is claimed is:

1. A cable provider's system that provides media content to an individual and enables the individual to tag a segment of the media content being observed by the individual and further enables the individual to upload the tagged segment onto a web site to be shared with external users, the cable provider's system comprising:
    a settop box having a tag module, the settop device configured to receive a digital signal from a cable company and to convert the digital signal into the media content which is displayed on a television; and
        in response to receiving one or more inputs from the individual via the tag module:
            record a first identifier indicating a beginning location in the media content;
            record a second identifier indicating an ending location in the media content, wherein the segment of the media content is defined by the first identifier and the second identifier;
    a remote control unit configured to receive a command from the individual, and send the command to the settop box as the one or more inputs for processing by the tag module;
    a click and save server;
    the settop box further configured to send data to the click and save server, the data comprising the first identifier, the second identifier, and a location identifier of a storage location of the media content;
    the click and save server is configured to receive the data and to store the data in a storage medium wherein the data is configured to be used to subsequently identify the segment of the media content;
    a data storage for storing the media content;
    a file and web server configured to provide the web site to all the external users so they can search for and request the segment of the media content;
    a trim and transcode server configured to receive the request from one of the external users and to obtain the segment of the media content so that the segment is made available to the one external user;
    the trim and transcode server upon receiving the request from the one external user is configured to:
        retrieve, from the click and save server, the data associated with the segment based on the user's request; and
        extract the segment from the media content stored in the data storage by utilizing the first identifier, the second identifier, and the location identifier obtained from the retrieved data to make the segment available to the one external user.

2. The cable provider's system of claim 1, wherein the beginning location is a predetermined offset position prior to a certain position in the media content when the settop device receives the one or more inputs, and the ending location is a predetermined offset position after the certain position in the media content when the settop device receives the one or more inputs.

3. The cable provider's system of claim 1, further comprising a network, wherein the click and save server is located remote from the settop device, and the settop device is configured to send the data over the network to the click and save server.

4. The cable provider's system of claim 1, wherein the media content comprises a digital cable program.

5. The cable provider's system of claim 4, wherein the data further comprises a program identifier of the digital cable program.

6. The cable provider's system of claim 1, wherein the data further comprises a user identifier associated with the individual.

7. The cable provider's system of claim 6, wherein the click and save server is further configured to determine the user identifier associated with the individual based on an address of the settop device.

8. The cable provider's system of claim 1, wherein the trim and transcode server provides a search engine configured to be used by the external users to identify the segment.

9. The cable provider's system of claim 1, wherein the request indicates to trim the extracted segment and the trim and transcode server is configured to trim the extracted segment.

10. The cable provider's system of claim 1, wherein the request indicates to transcode the extracted segment to a particular file format and the trim and transcode server is configured to transcode the extracted segment to the particular file format.

11. The cable provider's system of claim 1, wherein the trim and transcode server is configured to store the extracted segment.

12. The cable provider's system of claim 11, wherein the trim and transcode server is configured to create a hyperlink to the particular media content and store the hyperlink along with the extracted segment.

13. The cable provider's system of claim 11, wherein the trim and transcode server is configured to:
create a thumbnail preview of the extracted segment by extracting one or more frames of the extracted segment and transcoding the one or more frames to a particular file format; and
store the thumbnail preview along with the extracted segment to make the thumbnail preview available to the user.

14. The cable provider's system of claim 1, further comprising a Digital Rights Management (DRM) server for providing a license over a network to the one external user to enable the one external user to observe the extracted segment of the media content, the DRM server further configured to:
receive a request for the license over the network from the one external user to enable the one external user to observe the extracted segment of media content on a player device, wherein the request comprises a player identifier identifying the player device and a user identifier identifying the one external user;
verify that the player device is associated with the one external user;
send a message comprising the user identifier to a billing system to confirm the one external user has rights to observe the extracted segment of media content; and
in response to verifying the player device is associated with the one external user and to receiving confirmation from the billing system that the one external user has rights to observe the extracted segment of media content:
generate the license; and
deliver the license to the player device, wherein the license is used by the player device to enable the one external user to observe the extracted segment of media content on the player device.

15. The cable provider's system of claim 14, wherein the request further comprises a content identifier identifying the extracted segment of media content, and the DRM server is configured to send the message further comprising the content identifier to confirm the one external user has rights to observe the extracted segment of media content.

16. The cable provider's system of claim 14, wherein the generated license that can only be used within a predetermined period of time.

17. The cable provider's system of claim 14, wherein the generated license is associated with the device identifier so that the user can only observe the segment of media content on the player device.

18. The cable provider's system of claim 1, further comprising a Digital Rights Management (DRM) server for providing a digital rights license over a network to the one external user to enable the one external user to observe the extracted segment of the media content, the DRM server further configured to:
receive a request for the license over the network from the one external user to enable the one external user to observe the extracted segment of media content on a player device, wherein the request comprises a player identifier identifying the player device and a certificate that indicates the one external user has rights to observe the extracted segment of media content;
verify that the player device is associated with the one external user;
confirm the authenticity of the certificate; and
in response to verifying the player device is associated with the one external user and to confirming the authenticity of the certificate:
generate the license; and
deliver the license to the player device, wherein the license is used by the player device to enable the one external user to observe the extracted segment of media content on the player device.

19. The cable provider's system of claim 18, wherein the generated license that can only be used within a predetermined period of time.

20. The cable provider's system of claim 18, wherein the generated license is associated with the device identifier so that the one external user can only observe the extracted segment of media content on the player device.

* * * * *